United States Patent [19]

Moreau

[11] Patent Number: 5,704,735
[45] Date of Patent: Jan. 6, 1998

[54] FLY CUTTER WHEEL WITH AT LEAST ONE TOOTH, IN PARTICULAR FOR MACHINING OPHTHALMIC LENSES

[75] Inventor: Jacques Moreau, Savigny Le Temple, France

[73] Assignee: Essilor International Compagnie Generale d'Optique, Charenton Le Pont, France

[21] Appl. No.: 647,107

[22] Filed: May 9, 1996

[30] Foreign Application Priority Data

May 9, 1995 [FR] France .................. 95 05467

[51] Int. Cl.[6] .................................................. B23C 5/02
[52] U.S. Cl. ..................................... 407/33; 407/53
[58] Field of Search ............................ 407/2, 6, 3, 5, 407/53, 56, 100, 11, 33; 408/59

[56] References Cited

U.S. PATENT DOCUMENTS

| | | |
|---|---|---|
| 3,056,186 | 10/1962 | Greenleaf . |
| 3,597,817 | 8/1971 | Whalley ............................ 407/11 |
| 3,788,625 | 1/1974 | Lindsay ............................ 407/40 |
| 3,831,236 | 8/1974 | Coburn ............................ 407/53 |
| 5,052,153 | 10/1991 | Wiand ............................ 407/32 |
| 5,092,083 | 3/1992 | Raffaelli ............................ 51/209 |
| 5,272,940 | 12/1993 | Diskin ............................ 407/119 |

FOREIGN PATENT DOCUMENTS 9318728  5/1994  Germany .................................. 23/5

*Primary Examiner*—Daniel W. Howell
*Assistant Examiner*—Mark Williams
*Attorney, Agent, or Firm*—Young & Thompson

[57] ABSTRACT

A fly cutter wheel has at least one projecting tooth at a distance from its rotation axis and a chip breaker forward of said tooth in its rotation direction. Applications include the machining of synthetic material ophthalmic lenses.

16 Claims, 1 Drawing Sheet

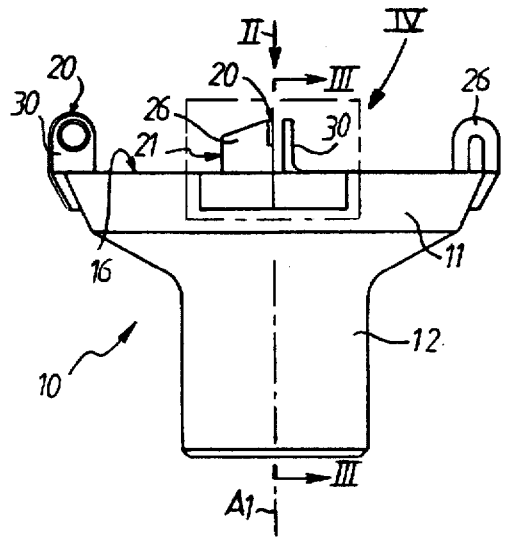
FIG 1
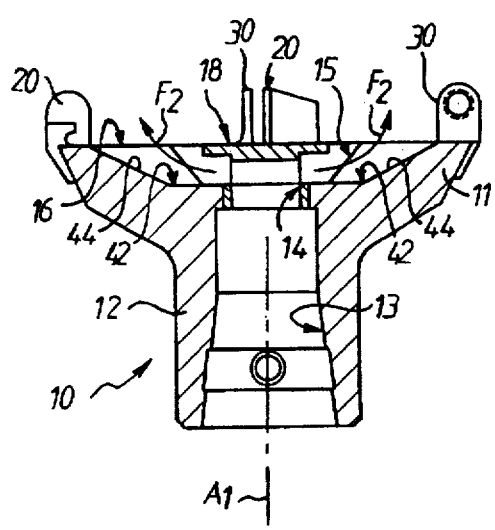
FIG. 3
FIG. 2
FIG. 5
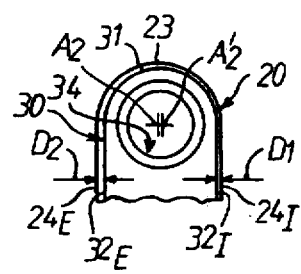
FIG 4
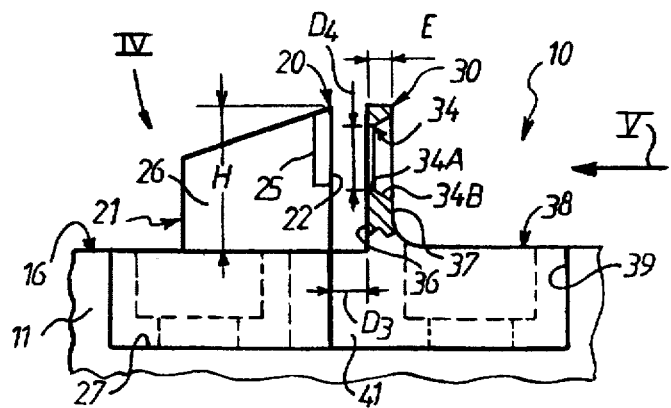

FLY CUTTER WHEEL WITH AT LEAST ONE TOOTH, IN PARTICULAR FOR MACHINING OPHTHALMIC LENSES

BACKGROUND OF THE INVENTION

1. Field of the Invention

The present invention concerns fly cutter wheels of the type used to machine ophthalmic lenses, for example.

It is more particularly concerned with fly cutter wheels that have at least one projecting tooth at a distance from the rotation axis, for example a polycrystalline diamond tooth.

2. Description of the Prior Art

A fly cutter wheel of this type is described in U.S. Pat. No. 5,092,083, for example.

In the above patent two teeth are provided, at diametrally opposite positions, in notches in the rim portion of a ring whose inside and outside faces are each coated with an abrasive material.

The size of the "chips" (machining waste) formed by the teeth varies with the nature of the machining operation and/or that of the machined material.

However, the chip size is usually between that of fine dust and that of grains of rice.

However, with some synthetic materials the machining waste can also form continuous chips with a corkscrew configuration and a length of several centimeters.

Removal of such continuous chips is a problem.

The machine can become clogged, with the attendant risk of malfunctions.

A general object of the present invention is an arrangement which, somewhat surprisingly, solves this problem in a very simple way.

SUMMARY OF THE INVENTION

The present invention consists in a fly cutter wheel having at least one projecting tooth at a distance from its rotation axis and a chip breaker forward of said tooth in its rotation direction.

The chip breaker is in practice in the general form of a flange parallel to the front face of the tooth and with a contour as seen in elevation similar to that of the tooth. There is preferably a hole in this flange.

Trials have shown that with a chip breaker of this kind the continuous chip formed by the tooth is advantageously broken up into fragments no larger than a grain of rice. It is not possible to provide a totally satisfactory formal explanation for this phenomenon.

Nevertheless, at least some of the continuous chip can be seen to pass through the hole in the chip breaker and is fragmented during this passage through the chip breaker, due to the stresses caused by turbulence due to the chip breaker and the cutting fluid used, in particular for cooling.

Be this as it may, the continuous chip that is formed is broken up and therefore easily removed.

The features and advantages of the invention will emerge from the following description given by way of example with reference to the appended diagrammatic drawings.

BRIEF DESCRIPTION OF THE DRAWINGS

FIG. 1 is a front elevation view of a fly cutter wheel of the invention.

FIG. 2 is a top view of the wheel as seen in the direction of the arrow II in FIG. 1.

FIG. 3 is a view of the wheel in axial section on the line III—III in FIG. 1.

FIG. 4 shows, to a larger scale and partially cut away, a detail of FIG. 1 identified by the frame IV in FIG. 1.

FIG. 5 is a partial front elevation view of the fly cutter wheel of the invention as seen in the direction of the arrow V in FIG. 4 and to the same scale as FIG. 4.

DETAILED DESCRIPTION OF THE PREFERRED EMBODIMENT

As shown in the figures, and in a manner that is known in itself, the fly cutter wheel 10 of the invention, which is for machining a synthetic material ophthalmic lens, not shown, attached to a support, includes a generally circular plate 11 and a shaft 12 coaxial with the plate 11 by which the latter is rotated.

The rotation axis $A_1$ is shown diagrammatically in chain-dotted line in FIGS. 1 and 3. Its position is shown in FIG. 2.

The shaft 12 is in one piece with the plate 11 and is a hollow shaft with an axial internal passage 13 which, where it discharges onto the plate 11, constitutes a fluid feed 14 for a cutting fluid, for example water, the functions of which include cooling.

In the embodiment shown the fluid feed 14 discharges into the back of a recess 15 in the top surface 16 of the plate 11 which is otherwise flat and substantially perpendicular to the rotation axis $A_1$.

As shown here, the fluid feed 14 is in practice controlled by a diffuser 18.

These provisions are well known in themselves and as they do not constitute any part of the present invention they are not described in more detail here.

Also in a manner that is known in itself, the fly cutter wheel 10 of the invention has at least one projecting tooth 20 at a distance from its rotation axis $A_1$, in practice at the periphery of its plate 11.

This is a polycrystalline diamond blade, for example, attached to a support block 21 and the front face 22 of which, relative to the rotation direction shown by the arrow F1 in FIG. 2, is substantially in a diametral plane of the plate 11.

As can be seen more clearly in FIG. 5, the contour of the tooth 20 as seen in elevation, i.e. the contour of its edge, is an arcuate contour with a semi-circular middle part 23.

The position of the axis $A_2$ of this middle part 23 is shown in FIG. 5.

In addition to the semi-circular middle part 23, the contour of the tooth 20 has two substantially parallel legs 24E, 24I, perpendicular to the top surface 16 of the plate 11.

The edge having this contour is in practice a cutting edge, the flank of the tooth 20 being bevelled accordingly.

Given the relative movement of the fly cutter wheel 10 and the surface to be machined, the latter is in practice cut by the radially innermost side of the tooth 20, i.e. the leg 24I of its contour, and finished by the radially outermost side of the tooth 20, i.e. the leg 24E of its contour.

In the embodiment shown, the blade constituting the tooth 20 is braced on the back, i.e. on its rear face 25, by a backing member 26 in one piece with the support block 21 and having a matching profile.

The combination is in practice removably attached to the plate 11, in a complementary recess 27 provided for it on the top surface 16 of the latter, by means of a screw 28, for example.

In the embodiment shown, the fly cutter wheel 10 of the invention comprises a plurality of teeth 20 that are regularly distributed around its perimeter, to be more precise the perimeter of its plate 11, on the same circumference as the latter.

As shown here, for example, four teeth 20 are provided at 90° to each other along the perimeter of the plate 11.

In accordance with the invention, the fly cutter wheel 10 further comprises, in front of at least one of the teeth 20 in the rotation direction shown by the arrow F1 in FIG. 2, a chip breaker 30.

In practice respective chip breaker 30 is associated in this way with each of the teeth 20.

In the embodiment shown, the chip breaker 30 is a flange parallel to the front face 22 of the associated tooth 20 and has a contour as seen in elevation similar to that of the latter.

This contour is thus an arcuate contour having a semi-circular middle part 31 and two lateral legs 32E, 32I.

As can be seen more clearly in FIG. 5, the contour of the chip breaker 30 as seen in elevation is preferably slightly set back at all points relative to that of the associated tooth 20, to prevent unintentional contact of the chip breaker 30 with the machined surface.

The chip breaker 30 is slightly offset towards the rotation axis $A_1$ relative to the tooth 20, so that its contour is nearer that of the tooth 20 on the radially innermost side of the latter than on its radially outermost side.

In other words, the distance $D_1$ separating the legs 24I, 32I of these contours is less than the distance $D_2$ separating their opposite legs 24E, 32E.

This means that the chip breaker 30 is closer to the tooth 20 on the cutting edge side of the latter.

The distance $D_1$ is preferably between 0 and 0.1 mm.

The distance $D_2$ is at least approximately 0.35 mm.

The chip breaker 30 associated with each tooth 20 is at a distance from the latter.

It is preferably at a distance $D_3$ from the tooth 20 between 2.5 mm and 3.5 mm.

In practice the distance $D_3$ is approximately 3 mm.

There is a hole 34 in the chip breaker 30.

The hole 34 has a circular contour.

Given the offset of the chip breaker 30 relative to the tooth 20, the axis $A'_2$ of the hole 34 is offset radially towards the rotation axis $A_1$ relative to the axis $A_2$ of the middle part 23 of the contour of the tooth 20, by an amount equal to $(D_2-D_1)/2$.

The hole 34 preferably widens in the direction from the rear face 36 to the front face 37 of the chip breaker 30 in at least part of the thickness E of the latter.

In the embodiment shown, the hole 34 comprises, starting from the rear face 36, a cylindrical first section 34A followed by a frustoconical second section 34B.

The diameter $D_4$ of the hole 34 at the rear face 36 is preferably at least equal to one third of the height H of the tooth 20 measured from the top surface 16 of the plate 11.

In practice the diameter $D_4$ is approximately 5.5 mm.

The thickness E of the chip breaker 30 is approximately 2 mm.

In the embodiment shown the chip breaker 30 associated with each tooth 20 is in one piece with the support block 38 by which it is attached to the plate 11, in a recess 39 in the latter, for example by means of a screw 40.

At the rear the support block 38 has a heel-piece 41 forming a spacer to control the separation from the tooth 20.

The chip breaker 30 and its support block 38 can be made from metal, for example.

It preferably has no sharp edges, to avoid the risk of injury.

In other words, its edges are defined by orthogonal surfaces, rather than by surfaces intersecting at an acute angle like those on the tooth 20.

As shown here, the top surface 16 of the plate 11 preferably has a slot 42 for each tooth 20 extending radially from the fluid feed 14 to the tooth 20 and the associated chip breaker 30.

At least in the vicinity of the tooth 20 and the chip breaker 30, the bottom 44 of the slot 42 is oblique to the rotation axis $A_1$, converging with the top surface 16 of the fly cutter wheel 10, or to be more precise that of its plate 11, in the direction away from the rotation axis $A_1$.

The angle between the top surface 16 of the plate 11 and the bottom 44 of the slot 42 is in practice approximately 25°.

When fitting the fly cutter wheel, the chip breaker 30 has the advantage of protecting the operator from being injured by the teeth 20, for improved safety.

In operation the cutting fluid directed onto the teeth 20 and the chip breakers 30 by the slots 42, in the direction of the arrows F2 in FIG. 3, generates turbulence near the teeth 20 and the chip breakers 30, because of the raised bottom 44 of the slots 42, and the chip breakers 30 advantageously break up the chip that is formed.

The hole 34 facilitates removal of the resulting chip fragments.

Experience has shown that the flared shape of the hole 34 promotes this removal.

Experience has also shown that in the event of a malfunction, for example in the event of the ophthalmic lens being machined becoming separated from its support, the chip breakers 30 of the invention advantageously protect the teeth 20.

The present invention is naturally not limited to the embodiment described and shown, but encompasses any variant execution thereof.

There is claimed:

1. Fly cutter wheel having a rotation axis and at least one projecting tooth at a distance from the rotation axis and a chip breaker forward of said tooth relative to the rotation direction thereof, said chip breaker having a hole therethrough.

2. Wheel according to claim 1 wherein said chip breaker is a flange parallel to a front face of said tooth and having a contour as seen in elevation similar to that of said tooth.

3. Wheel according to claim 2 wherein said contour as seen in elevation of said chip breaker is slightly inset relative to that of said tooth.

4. Wheel according to claim 3 wherein said chip breaker is slightly offset towards said rotation axis relative to said tooth so that its contour is nearer that of said tooth on the radially innermost side of said tooth than on the radially outermost side thereof.

5. Wheel according to claim 4, wherein said tooth has a contour which is arcuate with a semi-circular middle part and said hole in said chip has a circular contour, the hole having an axis radially offset towards the rotation axis of the cutter wheel relative to an axis corresponding to the semi-circular middle part.

6. Wheel according to claim 1 wherein said chip breaker is offset from said tooth by a distance between 2.5 mm and 3.5 mm.

7. Wheel according to claim 1 wherein said chip breaker is offset from said tooth by a distance of approximately 3 mm.

8. Wheel according to claim 1, wherein said tooth has a contour which is arcuate with a semi-circular middle part and said hole in said chip breaker has a circular contour.

9. Wheel according to claim 1 wherein, over at least part of the thickness of said chip breaker, said hole in said chip breaker widens in the direction from its rear face to its front face.

10. Wheel according to claim 9 wherein the diameter of said hole in said chip breaker at said rear face is at least equal to one-third the height of said tooth.

11. Wheel according to claim 10 wherein said diameter of said hole in said chip breaker at said rear face is approximately 5.5 mm.

12. Wheel according to claim 1 wherein said chip breaker has no sharp edges.

13. Wheel according to claim 1 wherein an axial fluid feed is provided and a slot extends radially from said fluid feed to said tooth and to its associated chip breaker.

14. Wheel according to claim 13 wherein, at least in the vicinity of said tooth and said chip breaker, said slot has a bottom that is oblique to said rotation axis, converging with a top surface of said wheel in the direction away from said rotation axis.

15. Wheel according to claim 13 wherein said fluid feed is controlled by a diffuser.

16. Wheel according to claim 1 comprising a plurality of teeth regularly distributed around its perimeter and each associated with a respective chip breaker.

* * * * *